Dec. 30, 1924.

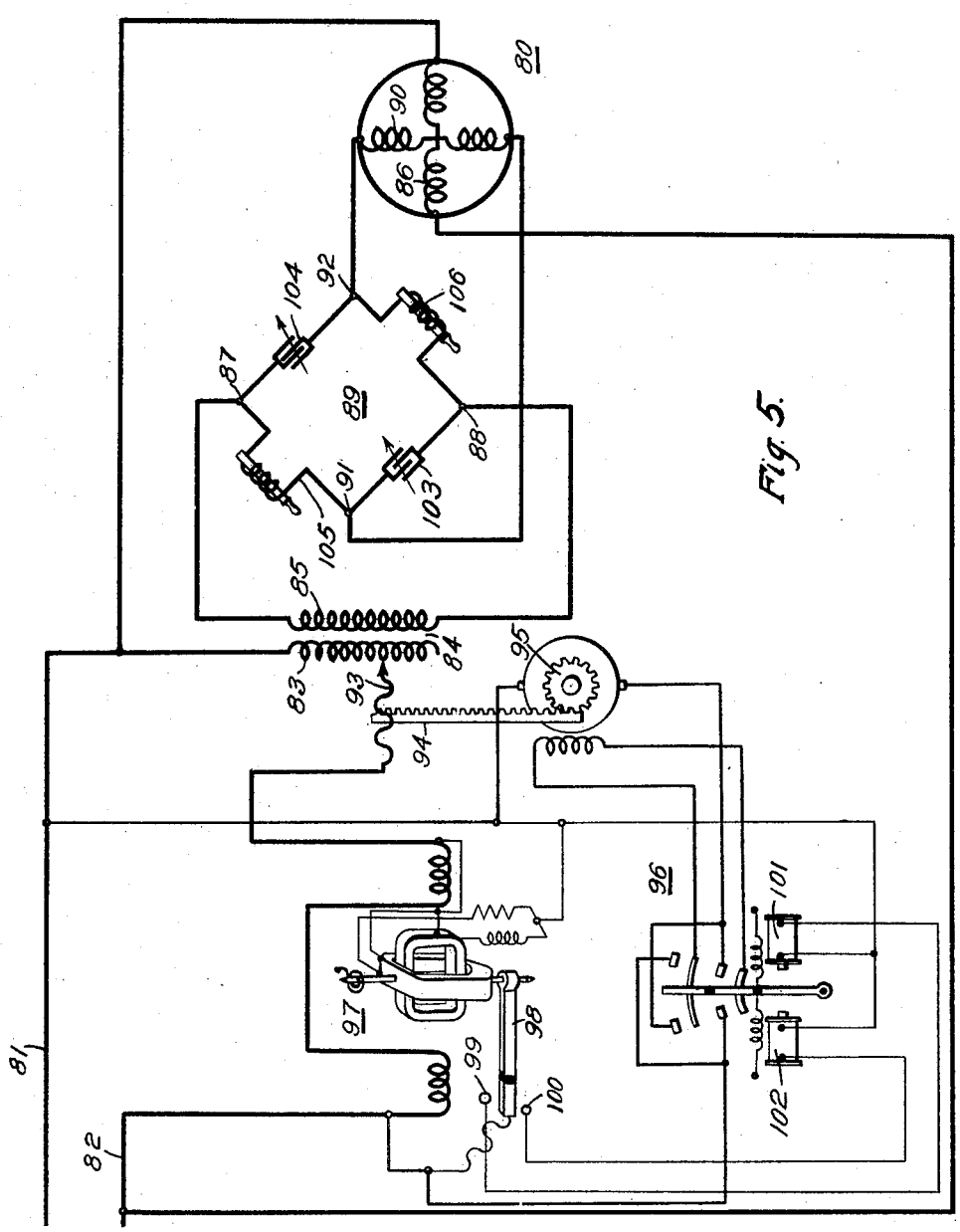

C. LE G. FORTESCUE 1,521,017

ELECTRICAL DISTRIBUTING SYSTEM

Filed May 14, 1921

WITNESSES:

INVENTOR
Charles Le G. Fortescue
BY
ATTORNEY

Patented Dec. 30, 1924.

1,521,017

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL DISTRIBUTING SYSTEM.

Application filed May 14, 1921. Serial No. 469,562.

*To all whom it may concern:*

Be it known that I, CHARLES LE G. FORTESCUE, a citizen of the United States, and a resident of Pittsburgh, in the county of Allegheny and State of Pennsylvania, have invented a new and useful Improvement in Electrical Distributing Systems, of which the following is a specification, this application being a continuation in part of my application, Serial No. 153,605, filed March 9, 1917.

My invention relates to alternating-current distributing systems and it has special relation to phase-modifying means whereby polyphase apparatus, such as motors, generators, rotary converters and the like, may be operated from single-phase power-supply circuits.

More particularly, my invention relates to phase-splitting devices and control means therefor, whereby the electrical conditions obtaining in the power-supply circuits may be controlled while balanced polyphase conditions, irrespective of the character of the polyphase loads, may be maintained in the polyphase circuits likewise associated with the phase-splitting devices.

By means of my present invention, balanced polyphase conditions may be automatically maintained in the polyphase circuits, irrespective of the polyphase loads obtaining therein or the power-factors at which such loads operate. At the same time, the power-factor of the single-phase supply circuit may be automatically maintained at a constant value or unity, irrespective of the load conditions in the polyphase circuits. In consequence thereof, polyphase apparatus, such as I have indicated above, may be economically and efficiently operated from a single-phase power-supply circuit with results comparable to those obtained when operating on polyphase circuits of the usual character. The single-phase power-supply circuit will also operate very efficiently since its power-factor is constantly maintained at a high value or unity.

Figure 1:
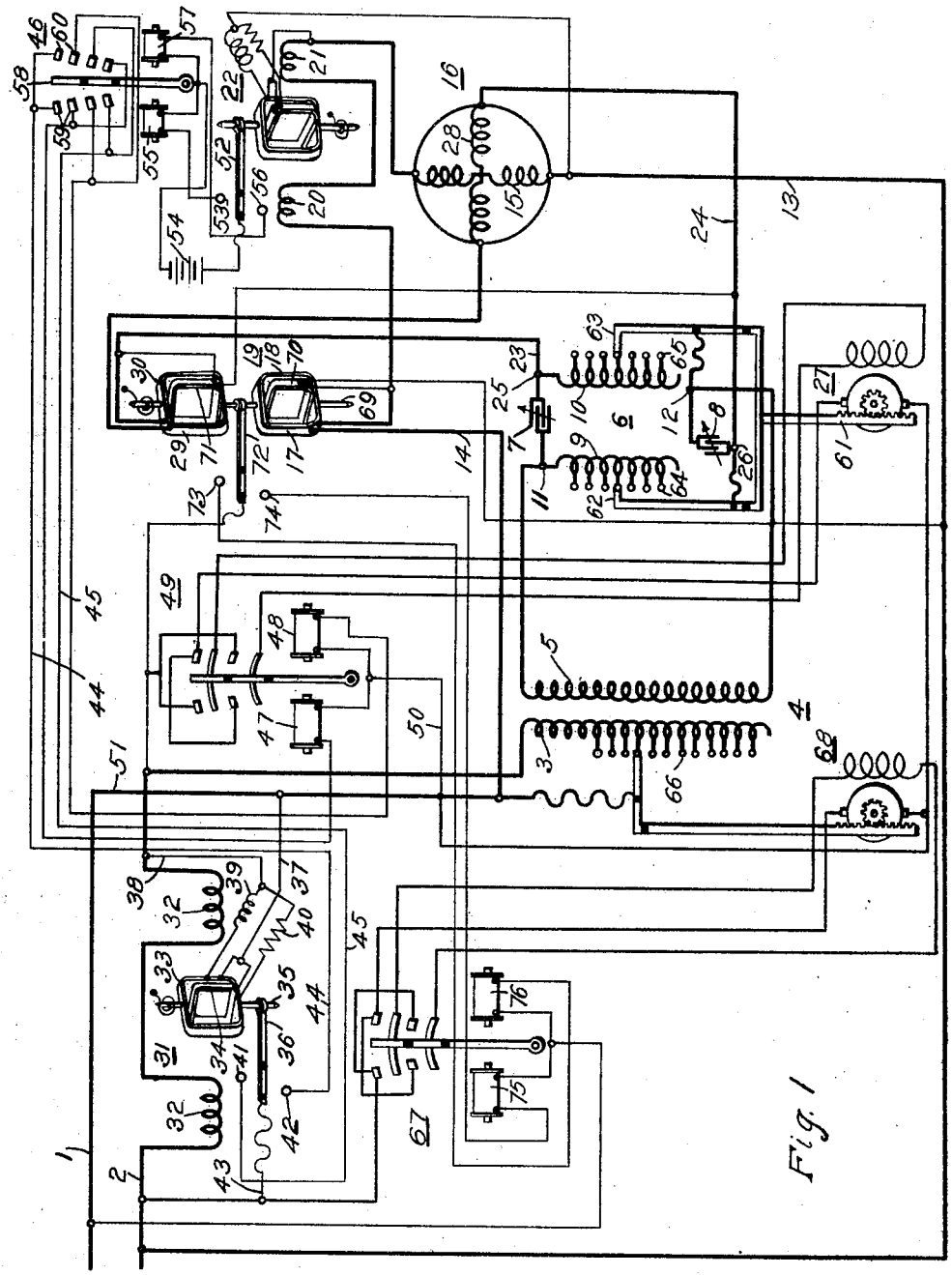
Figures 2, 3, 4:
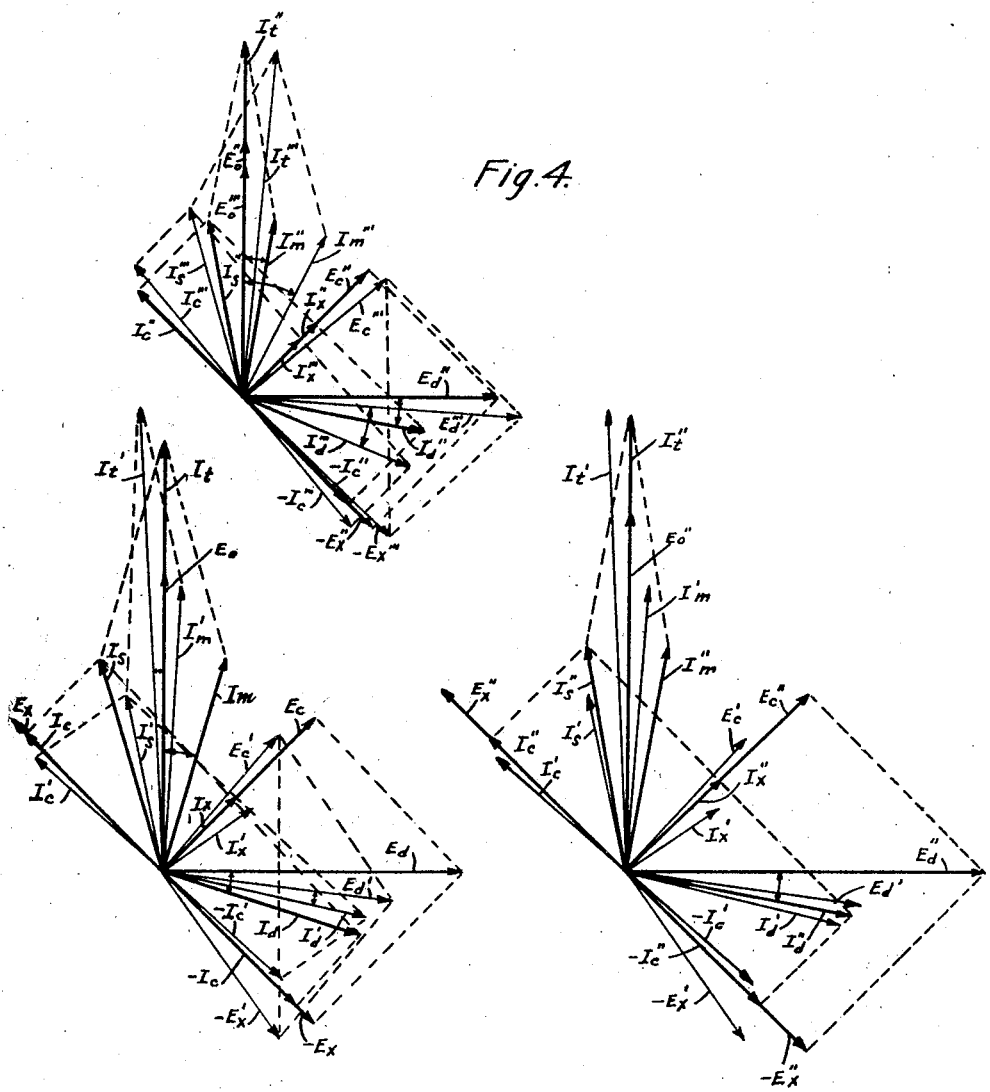
Figures 6, 7:
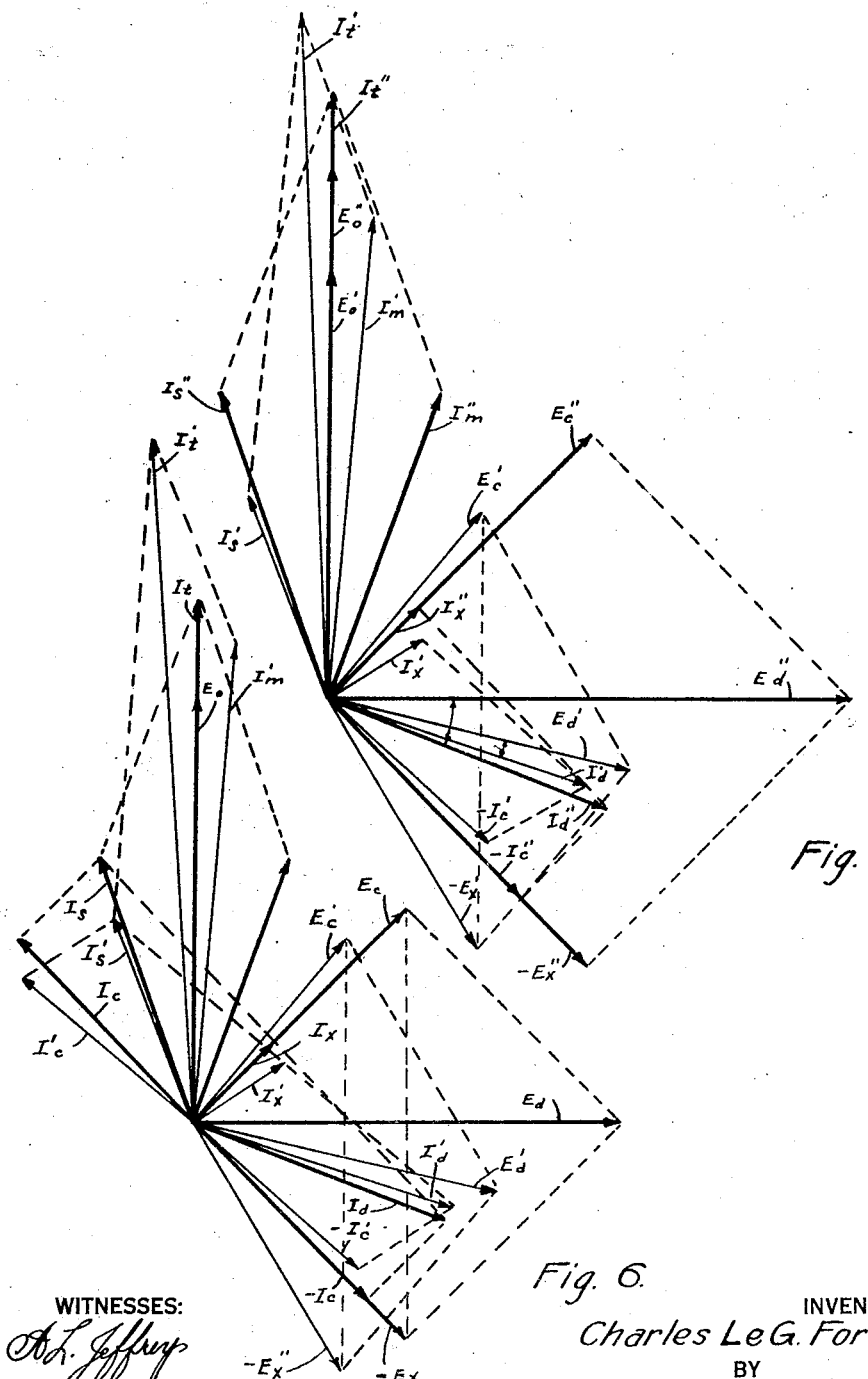

For a better understanding of the characteristic features of my invention, reference may be had to the following description and the accompanying drawings in which Figure 1 is a diagrammatic view of an alternating-current distributing system embodying a form of my invention; Figs. 2, 3 and 4 are vector diagrams illustrating the electrical conditions obtaining in the single-phase power-supply circuit and the polyphase load circuits, under different load conditions, of the system shown in Fig. 1; Fig. 5 is a diagrammatic view of a simplified form of the system of Fig. 1, and Figs. 6 and 7 are vector diagrams illustrating the electrical conditions obtaining in the system of Fig. 5.

Referring to Fig. 1, a single-phase power-supply circuit, comprising mains 1 and 2, is connected across an adjustable primary winding 3 of a power transformer 4. A secondary winding 5 thereof is connected across one diagonal of a phase-splitting device or "bridge" 6 which, in this instance, comprises two condensive elements 7 and 8 and two inductive reactance elements 9 and 10. The condensive elements alternate in position in a closed circuit with the inductive elements forming a square-formation that is provided with taps at the corners thereof, as will be hereinafter explained.

The secondary winding 5 of the transformer 4 is connected to the corners 11 and 12 of the phase-splitting device 6, while leads 13 and 14 extend from the mains 1 and 2 to an independent phase winding 15 of a polyphase apparatus 16. The lead 13 is connected directly to one terminal of the polyphase winding 15 while the lead 14 is connected through a current coil 17, which is embodied in a wattmeter element 18 of a differential wattmeter relay 19, and current coils 20 and 21 of a power-factor relay 22 to the other terminal of the phase winding 15. Leads 23 and 24, which are connected to diagonally opposite corners 25 and 26, respectively, of the phase-splitting device 6, are connected in circuit with a phase winding 28 of the polyphase apparatus 16. The lead 24 is connected directly to one terminal of the winding 28 while the lead 23 is connected through a current coil 29 of a wattmeter element 30 of the differential wattmeter relay 19 to the other terminal of the winding 28.

From the foregoing, it is apparent that the phase winding 15 is supplied directly with power from the single-phase supply circuit and the phase winding 28 is supplied with power through the phase splitting device 6. Since the windings 15 and 28 are shown as constituting the two windings of a two-phase apparatus, the electromotive forces obtaining in said windings must be displaced ninety degrees in phase relationship from, and be maintained equal to, each other in order to establish polyphase relations in the polyphase circuits. The polyphase apparatus 16 may be considered as a two-phase motor which is designed to operate under varying loads. For the purpose of illustration, it may be assumed that the motor 16 is so designed that, as the load on the motor increases, the power-factor thereof improves or approaches unity value. While the polyphase motor 16 operates under varying loads and with varying power-factors, it is desired to maintain the power-factor in the single-phase supply circuit constant or unity. For accomplishing these results, the control apparatus, hereinafter to be described, is arranged in order to vary the voltages impressed upon the phase-splitting device 6. At the same time, control means are provided for varying the ratios between the reactance elements embodied in the phase-splitting device. In this instance, I choose to vary the value of the inductive elements 9 and 10 but it will be appreciated that the condensive elements 7 and 8 may also be varied in a similar manner in order to vary the ratios between the "bridge" elements.

A power-factor relay 31 of a usual form of construction is connected in circuit with the main 2 of the single-phase power-supply circuit. The relay 31 comprises two stationary current coils 32 and two rotatable voltage coils 33 and 34 that are mounted upon a common shaft 35 with a rotatable arm 36. The two voltage coils 33 and 34 are severally connected in parallel across the mains 1 and 2 by means of leads 37 and 38. The voltage coil 33 is connected in series with an inductive element 39 and the coil 34 is connected in series with a resistance element 40.

When the power-factor in the single-phase circuit is substantially unity, the arm 36 will occupy a midposition between contact members 41 and 42. When the power-factor in the single-phase circuit is decreased by reason of lagging currents, it may be assumed that the conducting arm 36 engages the contact button 42 and when the power-factor is decreased by reason of leading currents, the conducting arm engages the contact button 41.

The rotatable arm 36 of the power-factor relay 31 is connected, by means of a lead 43, to the main 2. The contact buttons 41 and 42 are connected by means of leads 44 and 45, respectively, and a reversing switch 46 to the energizing magnets 47 and 48 of the reversing switch 49. The free terminals of the magnets are connected to common leads 50 and 51 to the main 1 of the single-phase supply circuit.

The power-factor relay 22 which, for convenience only, is shown as being connected in series with the independent phase winding 15 of the polyphase motor 16, is similar in all respects to the power-factor relay 31. The power-factor relay 22 is actuated in accordance with the power-factor of the phase winding 15 which, in the case of the motor 16, is assumed as drawing lagging currents. In this case, it may be assumed that a rotating arm 52 of the relay 22 engages a contact button 53, thereby establishing a circuit from a source of power 54 through an electromagnet 55 of the reversing switch 46. If the power-factor of the independent phase 15 is the result of leading currents, the rotatable arm 52 will engage a contact button 56 and thereby establish a circuit through an energizing magnet 57 of the reversing switch 46. It is, therefore, apparent that, if the power factor in the independent phase 15 is the result of lagging currents, the electromagnet 55 will be energized, thereby actuating a magnetizable arm 58 of the switch 46 to establish electrical connection between stationary contact members 59. Similarly, if the power-factor of the independent phase 15 is the result of leading currents, the arm 58 of the switch 46 will establish electrical connection between contact members 60 of the reversing switch 46. If the power factor of the independent phase 15 is unity, the rotating arm 52 will occupy a mid-position between the buttons 53 and 56 and the reversing switch 46 will not be actuated.

As mentioned above, the magnets 47 and 48 of the reversing switch 49 are energized in accordance with the position of the rotatable arm 36 of the power-factor relay 31 and the position of the arm 58 of the reversing switch 46. Assuming that lagging currents obtain in the single-phase supply circuit and the independent phase winding 15 of the polyphase apparatus, the rotatable arms of the two power-factor relays 31 and 22 will severally engage the contact buttons 42 and 53, respectively. With the relays 31 and 22 in these positions, the coil 47 of the reversing switch 49 will be energized through the contact members 59 of the reversing switch 46. If leading currents obtain in the single-phase supply circuit, while lagging currents obtain in the independent phase 15, the coil 48 of the reversing switch 49 will be energized by reason of the circuits established through the rotating arm 36 of the power-factor relay 31 and the contact button 41, as well as, through the contact members 59 of the reversing switch 46. If the power-factor in the independent phase 15 is the result of leading currents therein and the power factor in the single-phase circuit is the result of the flow of lagging currents, the coil 48 of the reversing switch will be energized because of the circuits established through the rotatable arm 36 and the contact button 42 of the power-factor relay 31 and through the contact members 60 of the reversing switch 46. If the power factor of the independent phase winding 15 is the result of leading currents and the power factor in the single-phase circuit is also the result of leading currents, the coil 47 of the reversing switch 49 will be energized by reason of the circuits established through the rotatable arm 36 and the contact button 41 of the relay 31 and the contact members 60 of the reversing switch 46.

It is, therefore, obvious that if the currents lead in both the polyphase and single phase circuits, or lag in both, the magnet 47 will be energized; if they lead in one and lag in the other, the magnet 48 will be energized; and if the power factor of either circuit be unity, neither magnet will be energized.

The reversing switch 49 is of a usual form of construction and controls the direction of rotation of a motor 27 which, in turn, actuates a rack 61 upon which adjustable contact members 62 and 63 are mounted and adapted to severally engage taps 64 and 65 with which the inductive elements 9 and 10, respectively, are provided. When the motor 27 rotates in one direction, the contact members 62 and 63 are moved downwardly and in unison and when the motor 27 rotates in the other direction the contact members 62 and 63 are moved upwardly and in unison. The variation in value of the inductive elements 9 and 10 of the phase-splitting device 6 is, therefore, controlled by the joint action of the power-factor relays 31 and 22 and the reversing switches 49 and 46. It follows, therefore, that, in the system shown, the ratios between the reactive elements comprising the phase-splitting device 6 are controlled by the power factors, as well as the relative direction of phase displacement of the currents obtaining in the single-phase circuit and in one of the phases of the polyphase circuit, which, for convenience, I have shown as being the independent phase 15.

As will be hereinafter disclosed, the voltage impressed upon the derived phase 28 of the polyphase device 16 will be varied as the loads carried by the motor 16 are varied in order to assist in conforming to the stated conditions, namely, balanced polyphase relations in the polyphase circuits and unity power factor in the single-phase circuit. When a one-to-one voltage transformation is effected by the phase-splitting device 6, the voltage impressed upon the phase-splitting device 6 will be correspondingly varied.

In accordance therewith, the primary winding 3 of the transformer 4 is shown as being provided with taps 66. In order to automatically vary the taps 66, the differential wattmeter element 19 is provided which controls a reversing switch 67 that, in turn, controls the direction of rotation of a motor 68. By reference to the drawing, it is apparent that the taps 66 are varied by the motor 68.

The differential wattmeter element 19 is of a usual form of construction and comprises the two superposed wattmeter elements 18 and 30 mounted upon a common shaft 69. The wattmeter element 18 comprises the current coil 17, which is connected in series with the independent phase 15, and a voltage coil 70 which is connected in shunt to the independent phase 15. The wattmeter element 30 likewise comprises the current coil 29, which is connected in series with the derived phase 28, and a voltage coil 71 which is connected in shunt to the derived phase 28. A rotatable arm 72 is adapted to engage either a contact button 73 or a contact button 74, depending upon which wattmeter element develops the predominating torque.

When the amounts of power supplied to both the phases 15 and 28 are equal, the arm 72 will occupy a mid-position between the contact buttons 73 and 74. When the power supplied to the independent phase 15 exceeds that supplied to the derived phase 28, the arm 72 may be assumed as making contact with the contact button 74, thereby energizing an electromagnet 75 of the reversing switch 67. When the power supplied to the derived phase 28 exceeds that supplied to the independent phase 15, the arm 72 may be assumed as making contact with the contact button 73, thereby energizing an electromagnet 76 of the reversing switch 67. When the electromagnet 75 is energized, a circuit is established through the reversing switch 67 to rotate the motor 68 in such a direction that the voltage impressed upon the secondary winding 5 will be increased, and, when the electromagnet 76 is energized, the motor 68 will be rotated in a reverse direction to decrease the voltage impressed upon the secondary winding 5.

In order to understand the operation of my system, attention is first directed to the vector diagrams of Figs. 2, 3 and 4 in order that the electrical conditions simultaneously obtaining in the single-phase and polyphase circuits, under different load conditions, may be observed.

In Fig. 2, two systems of vectors are superposed upon each other, one system representing the electrical conditions as they obtain in the system when balanced polyphase currents and voltages are imposed upon the polyphase circuits and the other system representing the electrical conditions as they obtain when unbalanced currents and voltages are imposed upon the polyphase circuits by reason of an increase in the load carried by the polyphase motor 16. These unbalanced polyphase conditions obtain only until the proper regulation by the control devices is effected thereby re-establishing balanced polyphase conditions, such as are represented by one of the systems of vectors of Fig. 3.

Referring particularly to Fig. 2, the vectors comprising the system representing balanced polyphase conditions will be described first. The vector $E_o$ represents the voltage impressed upon the phase-splitting device or bridge 6. The vector $E_d$ which, by reason of the one-to-one voltage transformation effected by the bridge 6, is equal to, and displaced ninety degrees from, the vector $E_o$ represents the voltage derived from the bridge 6 and impressed upon the derived phase winding 28 of the motor. The equal vectors $I_m$ and $I_d$ represent, in value and in phase, the currents obtaining in the phase windings 15 and 28, respectively. Since it has been assumed that the motor 16 has inherent inductive reactance, the currents flowing in the phase windings thereof lag behind their respective impressed voltages. The power factor of the motor 16 may be represented, therefore, by the phase angle between the vectors $E_d$ and $I_d$ or between the vectors $E_o$ and $I_m$.

Since the elements comprising the bridge are arranged for a one-to-one transformation, the vector $E_d$ may be resolved into two component vectors $E_c$ and $-E_x$, the former representing the voltage impressed across one of the condensive reactance elements and the latter representing the voltage impressed across one of the inductive reactance elements. The vectors $E_c$ and $-E_x$ are also equal to, and displaced ninety degrees in phase from, each other.

The current $I_d$ supplied by the bridge to the bridge-fed phase winding 28 of the motor 16 may be considered as the resultant of the currents obtaining in one of the inductive reactance elements and one of the condensive reactance elements. The current vector $I_d$ may, therefore, be resolved into two components that are positioned at right angles to each other; namely, the components $I_x$ and $-I_c$, the former being the current in one of the inductive elements and the latter being the current in one of the condensive elements. The current $I_x$ lags ninety degrees behind the voltage vector $E_x$ or is advanced ninety degrees ahead of the voltage vector $-E_x$ and the current $-I_c$ lags ninety degrees behind the voltage vector $E_c$ or the current $I_c$ is advanced ninety degrees ahead of the voltage vector $E_c$.

The current supplied to the bridge by the single-phase supply circuit is represented by the vector $I_s$ which, of course, is the resultant of the currents supplied to one of the inductive elements and one of the condensive elements. The vector $I_s$ may, therefore, be resolved into two components, one of which is the vector $I_c$ and the other of which is the vector $I_x$. The resultant current $I_s$ leads the voltage $E_o$ by the same angle that the current $I_d$ lags behind the voltage $E_d$ or the current $I_m$ lags behind the voltage $E_o$. Since the current supplied to the bridge 6 is represented by the vector $I_s$ and the current supplied to the independent phase winding 15 of the motor 16 by the vector $I_m$, the resultant current obtaining in the single-phase supply circuit may be represented by the vector $I_t$ which coincides in phase with the vector $E_o$. It is, therefore, apparent that the single-phase circuit operates at unity power factor, while the power factors obtaining in the polyphase circuits are less than unity and may be represented, as hereinbefore explained.

When a greater load is imposed upon the motor 16, unbalanced polyphase conditions will obtain until the control devices have re-established balanced polyphase conditions. As the load upon the motor is increased, it is assumed, as mentioned above, that its power factor is improved. Since the voltage $E_o$ impressed upon the bridge remains constant, for the time being, the current supplied to the bridge-fed phase 28 of the motor, which current may be represented by the vector $I'_d$, remains equal to the current $I_d$ supplied when balanced polyphase conditions obtain. This is by reason of the fact that a constant current is delivered to the derived phase 28 by the bridge 6 as long as a constant voltage is impressed upon the bridge. The current vector $I'_d$ moves to such position, therefore, that the power factor obtaining in the bridge-fed phase winding 28 of the motor is improved.

Since the power factor of the motor has improved, the voltage impressed by the bridge 6 upon the bridge-fed phase 28 of the motor will decrease in value because of the lower impedance offered, under this changed condition, to the flow of current of the same value through the bridge-fed phase winding. The voltage impressed by the bridge, under this changed condition, is represented by the vector $E'_d$ which is less than the vector $E_d$ and is rotated in such direction that the phase angle between the vectors $E'_d$ and $I'_d$ will be less than the phase angle between the vectors $E_d$ and $I_d$. This, as explained above, results by reason of the better power factor obtaining in the bridge-fed phase 28 with increased load.

The voltage vector $E'_d$ is rotated clockwise with respect to its original position, as indicated by the vector $E_d$, because the values of the elements comprising the bridge 6 are not varied. As a result, the ratios between the elements are constant and this condition is obtained by rotating the vector $E'_d$ as shown in the drawing and confirmed by construction of the vector diagrams.

The voltage vector $E'_d$ may be resolved into two vectors $E'_c$ and $-E'_x$ which, in this distorted condition of the bridge, will not be equal to each other. Their values and phase positions, however, may be determined since the impressed voltage $E_0$ has remained constant, both in value and in phase position, and represents one of the diagonals of the parallelogram of which the voltage vector $E'_d$ is the other diagonal. Since the phase position and values of the vectors $E'_c$ and $E'_x$ are thus determined, the vector $I'_d$, representing the current delivered by the bridge, may be resolved into its components; namely, the vectors $-I'_c$ and $I'_x$. The vector $-I'_c$ is displaced ninety degrees from the vector $E'_c$ and the vector $I'_x$ is displaced ninety degrees from the vector $-E'_x$. The vector $-I'_c$ represents the current in one of the condensive elements and the vector $I'_x$ represents the current in one of the inductive elements, when unbalanced polyphase conditions obtain.

Since the current supplied by the bridge is constant, as represented by the vector $I'_d$, the current delivered to the independent phase winding 15 of the motor is considerably increased since the power developed by this phase winding must temporarily carry most of the increased load. This increased current is represented by the vector $I'_m$ which is advanced toward the vector $E_0$ by reason of the improved power factor obtaining in the phase winding 15 when the load upon the motor is increased.

The current supplied to the bridge by the single-phase power supply circuit is represented by the vector $I'_s$ which is the resultant of the vector $I'_c$ and the vector $I'_x$. Since the current supplied to the bridge is represented by the vector $I'_s$ and the current supplied to the independent phase winding 15 is represented by the vector $I'_m$, the resultant current temporarily obtaining in the single-phase supply circuit is represented by the vector $I'_t$ which slightly leads the voltage $E_0$ of the single-phase circuit.

In Fig. 3, the system of vectors of Fig. 2, representing the unbalanced polyphase conditions temporarily obtaining, are superposed upon a system of vectors which represent the balanced electrical conditions that are established by the control devices after an increased load has been imposed on the motor.

The vectors representing the unbalanced polyphase conditions are represented by the same reference characters as are employed in Fig. 2.

Since the load on the motor 16 is increased, the voltage impressed upon the bridge 6 is simultaneously increased, with a decrease in the inductive reactance of the inductive elements 9 and 10 embodied in the bridge. The ratios between the constants of the bridge elements are, therefore, varied and, in this particular instance, I choose to vary the value of the inductive elements 9 and 10 but it will be understood that the value of the condensive elements 7 and 8 may also be varied in order to vary the ratios between the bridge elements.

To re-establish balanced polyphase conditions, the power-factor relay 31 operates, by reason of the lagging current $I'_t$ in the single-phase circuit to vary the value of the inductive elements and simultaneously therewith the differential wattmeter relay 19 operates by reason of the increased power delivered to the phase winding 15 of the motor to vary the voltage impressed upon the bridge. These two variations are simultaneously effected until balanced polyphase conditions are restored in the polyphase circuits. In consequence thereof the power factor of the single-phase supply circuit is again unity and the amounts of power supplied to the two phases of the motor 16 are equal. Under these conditions the power-factor relay 31 assumes its zero position and the differential wattmeter relay 19 assumes its zero position.

When balanced polyphase conditions are restored the current obtaining in the bridge-fed phase 28 of the motor may be represented by the vector $I''_d$ and the voltage impressed thereupon by the bridge 6 is represented by the vector $E''_d$. The vector $E''_d$ is a resultant of two components $E''_c$ and $-E''_x$ which are equal to and are displaced ninety degrees in phase from each other. The current $I''_d$ is composed of two components $-I''_c$ and $I''_x$. From the relative values of the vectors $I''_x$ and $-I''_c$ it will be apparent that the ratios between the bridge elements have been varied and that the inductive reactance elements 9 and 10 have been decreased in value in order to permit more than proportionately increased currents to flow therethrough.

The vector $I''_m$, which is equal in value to the vector $I''_d$ and occupies the same relative position with respect to the voltage vector $E''_0$, represents the current supplied to the independent phase winding 15 of the motor. The current supplied to the bridge 6 by the single-phase supply circuit is represented by the vector $I''_s$ which is the resultant of the vector $I''_c$ and the vector $I''_x$. The resultant current obtaining in the single-phase circuit is, therefore, the resultant vector of the component vectors $I''_s$ and $I''_m$ and is represented by the vector $I''_t$ which is coincident in the phase with the vector $E''_0$. The vector $E''_0$ represents, in value and phase, the new voltages impressed upon the independent phase winding 15 of the motor and impressed upon the bridge 6 in order to re-establish balanced polyphase conditions in the polyphase circuits.

The vectors of Fig. 4 represent the electrical conditions obtaining in the system when the load upon the motor 16 is decreased in value after balanced polyphase conditions have been established in the polyphase circuits and unity power factor in the single-phase circuit. The balanced polyphase conditions are represented by vectors having ordinals corresponding to those in Fig. 3, but, for convenience in illustration, the scale of the vectors has been decreased.

When the load upon the motor 16 is decreased in value and before the regulating devices have had an opportunity to act, the power supplied to the independent phase winding 15 will decrease in value. Since the voltage represented by the vector $E''_0$ is constant, the current supplied to the independent phase 15 may be represented by the vector $I'''_m$. The phase angle between the voltage vector $E_0$ and $I'''_m$ is increased in value because it has been previously assumed that the power factor of the motor 16 decreases as the load decreases.

The current obtaining in the derived phase winding 28 remains constant and is represented by the vector $I'''_d$. This current does not change in value becaues the voltage $E''_0$ impressed upon the bridge 6 remains constant. Since the load upon the motor 16 has decreased in value, the reactance of the phase winding 28 has increased, and, consequently, the derived voltage impressed thereupon is increased in value and is represented by the vector $E'''_d$. The phase angle between the vectors $I'''_d$ and $E'''_d$ is also increased, representing a decreased power factor in the polyphase motor 16. While the voltage derived from the bridge 6 is increased, the voltage represented by the vector $E''_0$, which is that impressed upon the bridge 6, remains constant in value and in phase and, therefore, the voltages impressed across the inductive and condensive elements of the bridge 6 may be determined, as hereinbefore described. The voltage impressed across the condensers is represented by the vector $E'''_c$, and the voltage impressed across the inductive elements is represented by the vector $-E'''_x$. Since the currents obtaining in the inductive elements 9 and 10 are displaced ninety degrees from the voltages impressed thereupon and the currents obtaining in the condenser elements are displaced ninety degrees from the voltages impressed thereupon, the current vector $I'''_d$ may be resolved into its two components $-I'''_c$ and $I'''_x$. The vector $I'''_x$ is advanced ninety electrical degrees ahead of the vector $-E'''_x$ and the vector $-I'''_c$ lags ninety electrical degrees behind the vector $E'''_c$.

The current supplied to the bridge 6 is the resultant of the vector $I'''_c$ and the vector $I'''_x$ and is represented, in phase and magnitude, by the vector $I'''_s$. Since the current supplied to the bridge is represented by the vector $I'''_s$ and the current supplied to the independent phase winding 15 is represented by the vector $I'''_m$, the resultant current obtaining in the single-phase circuit is represented by the vector $I'''_t$ which lags behind the voltage $E'''_0$ obtaining in the single-phase circuit.

It has been assumed, throughout this discussion of the vector relationships obtaining in the system, that the polyphase load, namely, the motor 16, required lagging currents, or, in other words, operated at all times at a power factor less than unity. The following conclusions under these conditions may, therefore, be drawn:

When balanced polyphase conditions obtain in the polyphase circuits, and unity power factor obtains in the single-phase circuit, the power factor in the single-phase circuit will be decreased as a result of the leading current obtaining therein when an increased load is imposed upon the motor 16. The current obtaining in the single-phase circuit will, therefore, be a leading current, as represented by the vector $I'_t$ in Figs. 2 and 3, until balanced conditions are restored. After balanced conditions are restored and the load upon the motor 16 is decreased in value, the current in the single-phase circuit, as represented by the vector $I'''_t$ in Fig. 4, will lag behind the impressed voltage until balanced conditions again obtain.

Accordingly, the following conclusions may be deduced when the polyphase load is of such a character as to require leading currents:

In this event, when the load in the polyphase circuit is increased, after balanced conditions have been established, the current in the single-phase circuit will lag behind the impressed voltage until balanced polyphase conditions are again restored. When the load in the polyphase circuit is decreased in value, the current obtaining in the single-phase circuit will lead the impressed voltage. It is, therefore, obvious that the conditions obtaining in the single-phase circuit, if the polyphase load requires leading currents, will be the reverse of those obtaining, if the polyphase load requires lagging currents when the loads are increased or decreased in value.

Having observed these conditions, attention is directed to Fig. 1 in order that the operation of my present system may be more fully understood. Assuming that the two phases 15 and 28 of the polyphase circuit are inductive under all load conditions, the power-factor meter 22, which is influenced by the nature of the currents obtaining in the polyphase circuits, will continuously keep the circuit through the electromagnet coil 55 energized. In consequence thereof, the contact members 59 are connected in circuit by the arm 58 of the reversing switch 46.

When the load upon the motor 16 is increased, the power factor in the single-phase circuit will decrease by reason of the leading current flowing therein, as indicated by the vector $I'_t$ of Figs. 2 and 3. The power-factor relay 31 in the single-phase circuit consequently establishes a circuit through the electromagnet 48 of the reversing switch 49, which, on being actuated thusly, establishes a circuit through the motor 27. This circuit energizes the motor 27 in a manner to effect rotation thereof in such direction as to decrease the value of the inductive elements 9 and 10 embodied in the bridge 6.

Again, when the load upon the motor 16 is increased, as mentioned above, the differential-wattmeter relay 19 will be actuated by reason of the increased power obtaining in the phase winding 15 over that obtaining in the derived phase winding 28. A circuit through the electromagnet 75 of the reversing switch 67 is, therefore, established by reason of the differential wattmeter 19 closing a circuit through the rotating arm 72 and the contact member 73 thereof. The reversing switch 67 is, consequently, actuated to drive the motor 68 in such direction as to decrease the number of active turns embodied in the primary winding 3 of the transformer 4. By referring to the vectors in Fig. 3, it will be noted that balanced polyphase conditions are restored in the polyphase circuits and unity power factor is restored in the single-phase circuit by the two simultaneously effected adjustments, namely, that of the transformer 4 and that of the inductive elements 9 and 10 of the bridge 6, which inductive elements are varied in unison.

When the load upon the motor 16 is decreased in value, the power-factor relay 22 still occupies such position as to energize the electromagnet 55 of the switch 46, as stated above. The power-factor relay 31 will energize the electromagnet 47 of the reversing switch 49, since the power factor obtaining in the single-phase circuit, under this condition, is decreased below unity by reason of the flow of lagging current therein, as shown by the vector $I'''_t$ of Fig. 4. The energization of the electromagnet 47 reverses the direction of rotation of the motor 27, thereby increasing, in unison, the values of the inductive elements 9 and 10 embodied in the bridge 6.

At the same time, the power obtaining in the derived phase of the motor 28 will be greater than that obtaining in the independent phase 15 and, as a consequence thereof, the differential-wattmeter relay 19 will be actuated to energize the electromagnet 76 of the reversing switch 67. The reversing switch 67 will, therefore, reverse the direction of rotation of the motor 68, whereby the active turns in the primary winding 3 of the transformer 4 will be increased.

The inductive elements 9 and 10 of the bridge 6 are thus adjusted in unison and simultaneously with the adjustment effected in the transformer 4. When balanced conditions are established in the polyphase circuits, the differential-wattmeter relay 19 will occupy its midposition and, when unity-power factor obtains in the single-phase supply circuit, the power-factor relay 31 will occupy its mid-position. Consequently, the motors 27 and 68 will be de-energized.

If the polyphase load were non-reactive, the power factors of the polyphase circuits would, at all times, be unity. In consequence thereof, the power-factor relay 22 would occupy its mid-position and the power-factor relay 31 would occupy its mid-position. No adjustments would, therefore, be necessary to vary the ratio between the elements embodied in the phase-splitter or bridge 6 and the motor 27 would, therefore, not be energized, under any condition. The differential-wattmeter element 19, however, would operate as hereinbefore described, and complete automatic control of the system would be effected by varying the voltage impressed upon the phase-splitter 6 and the independent phase 15 of the motor 16.

If the power factors in the polyphase load circuits are less than unity, by reason of the polyphase loads requiring leading currents, the power-factor relay 22 will move the reversing switch 46 in such direction as to establish connection through the contact members 60. As a result, the electromagnet 48 of the reversing switch 49 will be energized when lagging currents flow in the single-phase power-supply circuit on an increasing polyphase load and the electromagnet 47 will be energized when leading currents flow in the single-phase circuit, on a decreasing polyphase load.

For convenience, I have shown the power-factor relay 31 as effecting the adjustments in the inductive elements 9 and 10 of the phase-splitter 6, but, it will be understood that, under certain conditions, the power-factor relay 31 may effect the adjustments in the active turns of the primary winding 3 of the transformer 4. Similarly, the differential wattmeter relay 19 may, under certain conditions, effect the adjustments in the elements 9 and 10 in place of the adjustments in the primary winding 3 of the transformer, as shown.

The power-factor relay 22, shown as being connected in circuit with the phase winding 15, may be connected in circuit with the phase winding 28, since it is presumed that the two phases comprising the polyphase circuit will require leading or lagging currents simultaneously with the changes in the load conditions.

While the ratios between the bridge elements is varied by varying the values of the inductive elements 9 and 10, as shown, they may be also varied by varying the values of the condensive elements 7 and 8, while maintaining the inductive elements intact.

While the system shown in Fig. 1 operates to maintain balanced polyphase relations in the polyphase circuits and unity power factor in the single-phase circuit, irrespective of the loads obtaining in, and the power factors of, the polyphase load circuits, the system shown in Fig. 5 may be employed when the polyphase load circuits operate at constant power factors. In this particular instance, a polyphase motor 80 is so designed that it will operate at a constant power factor under all load conditions. One method for accomplishing this result is to impose a load upon the motor 80, ensuring that balanced polyphase relations obtain therein. Having observed the power factor at which the motor 80 operates, under this condition, the voltages impressed upon the several phases thereof may be so varied, under the varying loads imposed upon the motor, that this constant power factor is maintained throughout the load curve of the motor.

A single-phase power-supply circuit, comprising leads 81 and 82, is connected across a primary winding 83 of a power transformer 84. A secondary winding 85 thereof is connected diagonally opposite points 87 and 88 of a phase-splitting device 89 and an independent phase winding 86 is connected across the leads 81 and 82. Another phase winding 90 of the motor 80 is connected to diagonally opposite points 91 and 92 of the phase-splitting device 89.

The transformer winding 83 is adjustable and the active turns thereof may be varied by means of a movable contact member 93 that is mounted upon a rack 94 which, in turn, is actuated by means of a motor 95. The motor 95 is adapted to be connected, through a reversing switch 96, to the single-phase mains 81 and 82. The reversing switch 96 is, in turn, controlled by means of a power-factor relay 97 which is connected in the single-phase power-supply circuit. A rotatable arm 98 is mounted upon the rotatable element of the power-factor relay 97 and is adapted to engage either a contact button 99 or a contact button 100, depending upon whether the current obtaining in the single-phase circuit is leading or lagging. When a circuit is established through the contact button 99 and the rotatable arm 98, an electro-magnet 101 of the reversing switch 96 is energized, and, when a circuit is established through the contact button 100 and the arm 98, a circuit through the electromagnet 102 of the reversing switch 96 is energized. The reversing switch 96 controls the direction of rotation of the motor 95, as hereinbefore explained in connection with the control devices embodied in the system of Fig. 1.

It is obvious from the foregoing that when the power factor in the single-phase supply circuit is unity, the arm 98 of the power-factor relay 97 will occupy a mid-position between the contact buttons 99 and 100 and, under this condition, the motor 95 will be disconnected from circuit.

The phase-splitting device 89 comprises two oppositely disposed condensive reactance elements 103 and 104 and two oppositely disposed inductive reactance elements 105 and 106. The reactive elements are connected in a closed circuit, as shown, and are preferably arranged for manual adjustment, whereby their electrical constants may be varied. These elements are also so chosen that a one-to-one voltage transformation may be effected by the phase-splitting device. That is, the voltage impressed across the diagonally opposite points 87 and 88 will be equal to, and displaced ninety degrees from, the voltage obtaining across the diagonally opposite points 91 and 92, when balanced polyphase relations obtain in the polyphase circuits.

Since the motor 80 is adapted to operate at a constant power-factor, irrespective of the load imposed thereupon, the reactive elements comprising the bridge 89 need be adjusted once only in order to ensure the production of balanced polyphase relations in the polyphase circuits. It is, therefore, unnecessary to provide means for automatically varying the ratios between the elements embodied in the bridge 89.

Attention may now be directed to the vector diagrams in Figs. 6 and 7 in order to more fully understand the electrical conditions obtaining in the single-phase and polyphase circuits of the system shown in Fig. 5. The vectors of Figs. 6 and 7 are designated with the same reference characters as are applied to the corresponding vectors of Figs. 2 and 3.

Assuming that balanced polyphase relations obtain in the polyphase circuits and unity power factor in the single-phase circuit, the vectors $E_o$ of Fig. 6 represents the voltage impressed upon the phase-splitting device 89 while $E_d$ represents the voltage impressed upon the phase winding 86 of the motor 80. The vector $I_m$ represents the current obtaining in the phase winding 86, the vector $I_d$ the current obtaining in the phase winding 90 and the vector $I_s$ the current supplied to the bridge 89 by the single-phase supply circuit. The vector $I_t$, therefore, represents the total current flowing in the single-phase supply circuit and, since this current is in phase with the impressed voltage, it will be observed that the power factor obtaining in the single-phase circuit is unity. When an increased load is imposed upon the motor 80, the vectors are displaced, as shown. It is to be noted particularly that, under this unbalanced condition, the current vector $I'_t$, which represents the current temporarily obtaining in the single-phase circuit, leads the impressed voltage $E_o$.

Since the power factor in the single-phase circuit has now decreased below unity by reason of the leading current $I'_t$ obtaining therein, the power-factor relay 97 will establish a circuit through the contact button 99, the rotatable arm 98 and the energizing magnet 101 of the reversing switch 96. In consequence thereof, the motor 95 is rotated in such direction as to increase the voltages impressed upon the phase-splitting device 89. The motor 95 will continue to rotate until unity power factor is restored in the single-phase circuit. When the relay 97 assumes a mid-position between the buttons 99 and 100, balanced polyphase relations will then be indicated as having been restored in the polyphase circuits.

The balanced conditions obtaining in the polyphase circuits under the increased load upon the motor 80 are represented by the vectors of Fig. 7. The phase angles between the vectors $E''_d$ and $I''_d$ and between the vectors $E''_o$ and $I''_m$ of Fig. 7 are equal to the phase angles between the vectors $E_d$ and $I_d$ and between the vectors $E_o$ and $I_m$ of Fig. 6, thereby indicating that the power factor of the motor remains constant. By varying the voltages impressed upon the bridge 89 complete regulation of the system is obtained.

After balanced polyphase conditions have been re-established and the load upon the motor 80 is decreased the unbalancing conditions temporarily obtaining will cause the current in the single-phase circuit to lag behind the impressed voltage. In consequence thereof, the power-factor relay 97 will close an exciting circuit through the contact button 100, the rotatable arm 98 and the energizing magnet 102 of the reversing switch 96. The motor 95 will be rotated in the opposite direction, thereby decreasing the voltages impressed upon the phase splitter 89.

From the foregoing, it will be apparent that the control devices necessary for maintaining the desired relations when the power-factors of the polyphase load circuits remain constant are more simple in construction and operation than those required for a system operating under the conditions for which the system of Fig. 1 is designed.

While I have shown and described several embodiments of my invention, it is to be understood that many modifications may be made therein and, consequently, that the invention is not to be limited to the forms herein specifically described, since it is capable of other embodiments that do not depart from the spirit and scope of the appended claims.

I claim as my invention:

1. The combination with a single-phase power-supply circuit, polyphase load circuits, and phase-modifying means connected with said circuits to enable polyphase apparatus to operate on the single-phase supply circuit, of automatic means responsive to certain relative conditions of the polyphase apparatus windings for maintaining substantially balanced polyphase conditions in said polyphase circuits and automatic means responsive to relative power-factor conditions of said power supply circuit and of one of said polyphase windings for maintaining substantially unity power factor in said single-phase circuit, irrespective of the character of the loads obtaining in the polyphase circuits.

2. The combination with a single-phase power-supply circuit, polyphase load circuits, and phase-modifying means connected with said circuits to enable polyphase apparatus to operate on the single-phase supply circuit, of automatic means responsive to relative wattage conditions of the polyphase apparatus windings for maintaining substantially balanced polyphase conditions in said polyphase circuits and automatic means responsive to certain relative conditions of said power-supply circuit and of one of said polyphase windings for controlling the power factor in said single-phase circuit, irrespective of the load conditions obtaining in the polyphase circuits.

3. The combination with a single-phase power-supply circuit, polyphase load circuits, and phase-modifying means connected with said circuits to enable polyphase apparatus to operate on the single-phase supply circuit, of automatic adjusting means responsive to certain relative conditions of the polyphase apparatus windings for retoring the desired phase relations in the polyphase circuits and means responsive to relative power-factor conditions of said power supply circuit and of one of said polyphase windings for maintaining unity power factor in the single-phase circuit in case of departure therefrom by reason of varying loads obtaining in the polyphase circuits.

4. The combination with a single-phase power-supply circuit, polyphase load circuits, and phase-modifying means connected with said circuits to enable polyphase apparatus to operate on the single-phase supply circuit, of automatic means controlled by the relative power demands in the several polyphase circuits for restoring the desired phase relations in the polyphase circuits and automatic means controlled by the power factors obtaining in the single-phase circuit and in one of the polyphase circuits for maintaining unity power factor in the single-phase circuit, in case of departure therefrom.

5. The combination with a single-phase power-supply circuit, polyphase load circuits, and phase-modifying means connected with said circuits to enable polyphase apparatus to operate on the single-phase power-supply circuit, of automatic means controlled by the relative power demands in the several polyphase circuits for maintaining substantially balanced polyphase relations in the polyphase circuits and automatic means controlled by the power factor of one of the polyphase load circuits and the power factor obtaining in the single-phase circuit for maintaining substantially unity power factor in the single-phase circuit, irrespective of the load conditions obtaining in the polyphase circuits.

6. The combination with a single-phase power supply circuit, polyphase load circuits, and a phase-splitting device comprising a plurality of condensive and inductive reactance elements connected in a closed circuit for delivering energy from the single-phase circuit to said polyphase circuit, of automatic means responsive to certain relative conditions of the polyphase apparatus windings for maintaining substantially balanced polyphase relations in the polyphase circuits and means responsive to relative power-factor conditions of said power supply circuit and of one of said polyphase circuits for maintaining substantially unity power factor in the single-phase circuit, irrespective of the load conditions obtaining in said polyphase circuits.

7. The combination with a single-phase power-supply circuit, and an electrical apparatus having polyphase circuits, of a phase-splitting device comprising a plurality of condensive and inductive reactance elements connected in a closed circuit for delivering energy from the single-phase circuit to said polyphase apparatus, automatic means responsive to relative wattage conditions of the polyphase circuits for maintaining substantially balanced polyphase relations in the polyphase circuits and means responsive to relative power-factor conditions of said power-supply circuit and of one of said polyphase circuits for regulating the power factor of the single-phase circuits.

8. The combination with a single-phase power-supply circuit, and polyphase load circuits, of a bridge comprising condensive and inductive reactance elements alternating in position with one another in a closed circuit for interconnecting said single-phase and said polyphase circuits, automatic means responsive to relative power-factor conditions of said power-supply circuit and of one of said polyphase circuits for maintaining substantially unity power factor in the single-phase circuit and means responsive to certain relative conditions of said polyphase circuits for maintaining substantially balanced polyphase relations in said polyphase circuits which operate at varying power factors and under varying loads.

9. The combination with a single-phase circuit, and polyphase load circuits, and a bridge comprising condensive and inductive reactance elements alternating in position with one another in a closed circuit for interconnecting said single-phase and polyphase circuits, one pair of similar elements comprising said bridge being adjustable, of automatic means responsive to relative power-factor conditions of said single-phase circuit and of one of said polyphase circuits for varying the value of said adjustable elements and means responsive to relative load conditions of said polyphase circuits for varying the voltage impressed on said bridge.

In testimony whereof, I have hereunto subscribed my name this 26th day of April, 1921.

CHARLES LE G. FORTESCUE.